(12) United States Patent
Shultz

(10) Patent No.: US 6,474,260 B1
(45) Date of Patent: Nov. 5, 2002

(54) RECOILING-ACTION WILDLIFE FEEDER

(76) Inventor: David Scott Shultz, 1754 Field Ave., St. Paul, MN (US) 55116

( * ) Notice: Subject to any disclaimer, the term of this patent is extended or adjusted under 35 U.S.C. 154(b) by 66 days.

(21) Appl. No.: 09/677,702

(22) Filed: Sep. 30, 2000

Related U.S. Application Data

(60) Provisional application No. 60/175,711, filed on Jan. 12, 2000.

(51) Int. Cl.[7] ................................................ A01K 5/00
(52) U.S. Cl. ..................................... 119/51.03; 119/708
(58) Field of Search ............................. 119/51.03, 706, 119/708

(56) References Cited

U.S. PATENT DOCUMENTS

| | | | | |
|---|---|---|---|---|
| 1,550,438 A | * | 8/1925 | Hohmann | 119/70 |
| 2,698,598 A | * | 1/1955 | Hadley | 119/708 |
| 5,111,771 A | * | 5/1992 | Mathews | 119/708 |
| 5,357,904 A | * | 10/1994 | Takahashi et al. | 119/708 |
| 6,085,693 A | * | 7/2000 | Guerrette | 119/51.03 |

* cited by examiner

*Primary Examiner*—Robert P. Swiatek
(74) *Attorney, Agent, or Firm*—Schwegman, Lundberg, Woessner & Kluth, P.A.

(57) ABSTRACT

A feeding apparatus for wildlife, particularly squirrels, is shown. One embodiment of the feeding apparatus includes a generally vertical, suspended flexible assembly of materials for holding a self-contained food unit. One embodiment of the feeding apparatus further includes a resilient biasing device mountable within the length of the apparatus. One end of one embodiment of the feeding apparatus includes an adjustable device for suspending the apparatus. The opposite end of one embodiment includes a device for securing the self-contained food unit. When an animal leaps up and grasps the food unit, the resilient biasing device lengthens and contracts, causing the animal to rise and fall while swinging to and fro spinning around on the apparatus. To the amusement of an observer, the animal is in effect, "bungee jumping."

11 Claims, 3 Drawing Sheets

RECOILING-ACTION WILDLIFE FEEDER

CROSS REFERENCE TO RELATED APPLICATIONS

This application is entitled to the benefits of Provisional Patent Application Serial No. 60/175711, filed Jan. 12, 2000.

BACKGROUND—Field of Invention

The present invention relates generally to an apparatus for feeding wild animals. Specifically it relates to a simple and novel apparatus for the feeding of squirrels.

BACKGROUND—Description of Prior Art

Squirrels are known for their playfulness, appealing/comical appearance, and agility. As such, they can be entertaining visitors to a wildlife feeding station. Squirrels are also known for their attraction to and subsequent theft from and damage to feeders designed for birds. It is this aspect of their nature that makes them unwelcome guests to a wildlife feeding station. The present invention seeks to capitalize on the positive aspects and ameliorate the negative aspects of squirrel visitation to wildlife feeding stations.

Conventional feeders designed for squirrels are well known in the art. Such prior art devices consist of static corn cob holders, rotatable feeders that spin under the squirrel's weight, and hoppers or housings into which food is placed. Such devices, though effective as feeders, have limited entertainment value. Basically, the observer of such a device is treated to the sight of a squirrel eating, perhaps in anthropomorphic settings (such as a squirrel-sized chair or bicycle) or performing a small task to acquire the food (raising a lid to retrieve food). With the rotating feeders, the action is generally limited to a short-lived rotation or swing until the animal balances itself.

Additionally, these conventional feeders are generally bulky and require a significant amount of shelf space for retail display and are, in some instances, composed of material easily damaged by the squirrel.

Consequently, it is a primary objective of the present invention to provide longer-lived amusement and entertainment to spectators of the squirrel's antics while they feed. This is accomplished by mounting the apparatus in such a way that the food unit dangles approximately 24–30 inches above the ground. When a squirrel leaps up and grasps the dangling food and "rides" the apparatus, the swinging, spinning and bouncing results in entertaining postures and reactions from the squirrels. The feeding squirrel is in effect, "bungee jumping".

An additional objective of the present invention is to provide a safe feeding apparatus to the squirrels. This is accomplished by a fabric tube encompassing the spring, preventing animal appendages from slipping between coils of the spring and resulting in a pinching injury. Additionally, the cable portion of the apparatus is sufficiently rigid as to prevent the apparatus from wrapping around the body of the feeding animal and causing injury.

An additional objective of the present invention is to lure the squirrels away from the feeders designed for birds. Although the present invention, like all squirrel feeders, will not stop the squirrels from feeding on birdfeeders, it will offer an opportunity to satiate the squirrel's hunger with "squirrel food" before the squirrel chooses the "bird food".

An additional objective of the present invention is to provide a product requiring a minimal amount of shelf space for retail operations. This is accomplished by the apparatus' inherent flexibility, allowing it to be coiled and placed inside a relatively small package.

The description outlined above is considered to be illustrative only of the principles of the present invention and is in no way intended to limit the scope of any protection afforded the invention. This description is representative of only one embodiment of the invention that accomplishes all of the stated objectives.

SUMMARY

In accordance with the present invention, a suspendable animal feeding apparatus that extends and retracts with the weight of the feeding animal creating the effect of a "bungee-jumping" animal.

Objects and Advantages

Accordingly, besides the objects and advantages of the animal feeding apparatus described in my above patent, several objects and advantages of the present invention are:

a) an extended period of entertainment due to the invention's recoiling-action;

b) a novel period of entertainment due to the unexpected reaction of the feeding animal to the recoiling action;

c) a safe feeding apparatus with gentle recoiling action and potentially injurious parts covered;

d) a compactable design allowing for a compact package;

e) manufactured of weather-and squirrel-resistant materials.

DRAWINGS

Reference Numerals/Letters
A-overhead structure
B-present invention
C-typical food unit
D-typical animal
100-suspension means
101-locking device (cable tie)
102-chain
104-chain/spring connection
106-spring
108-safety shroud
110-spring/cable connection
111-ferrule
112-cable
113-ferrule
114-cable/eye-lag-screw connection
116-eye-lag-screw

DESCRIPTION

Figure 1:
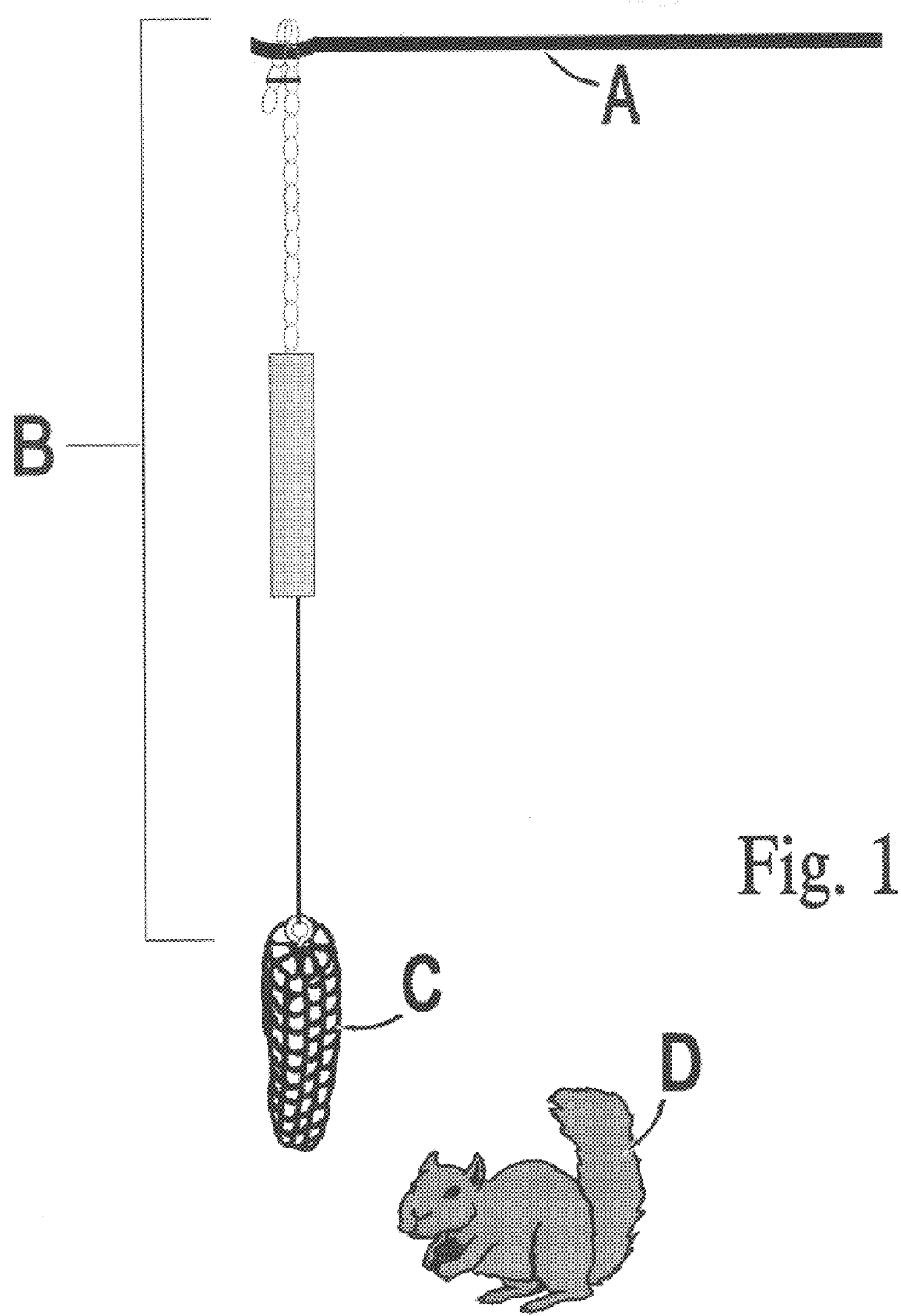
FIG. 1 is an overall front-view of the present invention.
Figure 2:
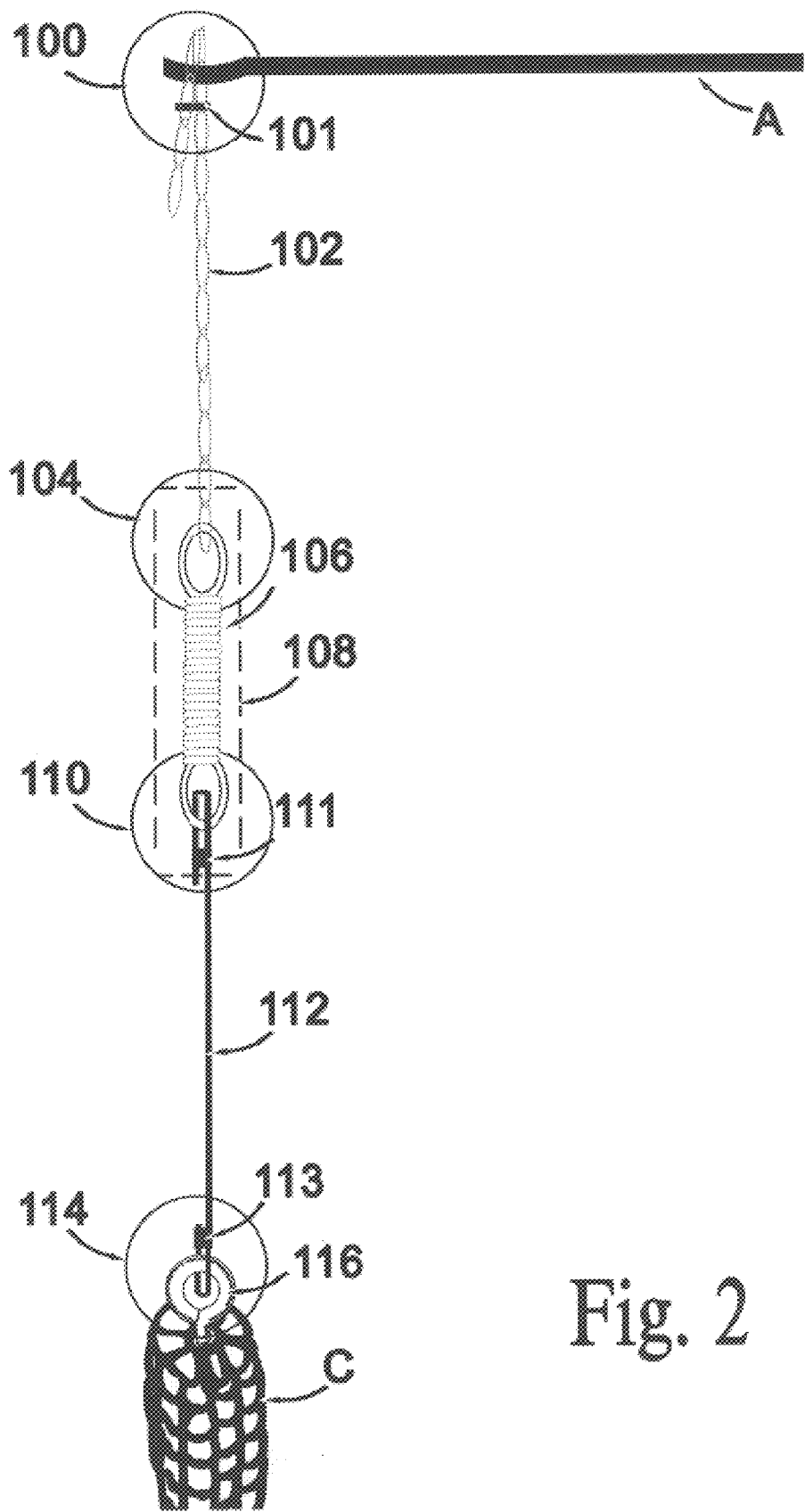
FIG. 2 is an overall front-view of the present invention with parts numbered.
Figure 3:
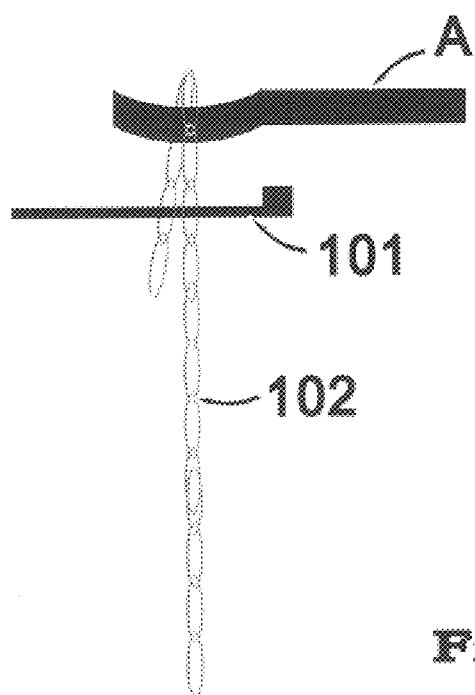
FIG. 3 is a large-scale detail of the means of suspension of the present invention.

A preferred embodiment of the present invention is detailed in FIG. 2. The invention is suspended by wrapping chain (102) over overhead structure (A) and securing chain (102) to itself with locking device (101). This suspension means (100) is shown in detail in FIG. 3.

Figure 4:
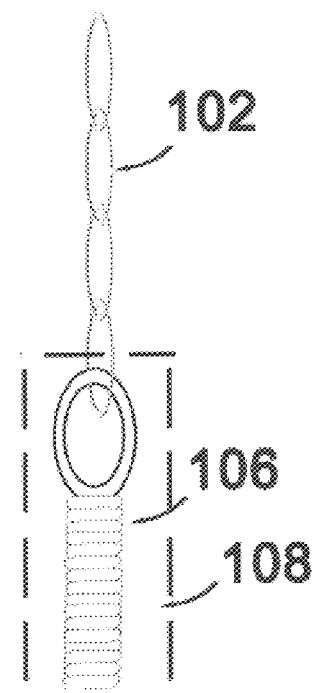
FIG. 4 is a large-scale detail of the chain/spring engagement.

The distal end of chain (102) is attached to spring (106) by capturing the bottom link of chain (102) in the end loop of spring (106) and pinching said end loop closed. This attachment is shown in detail in FIG. 4.

Figure 5:
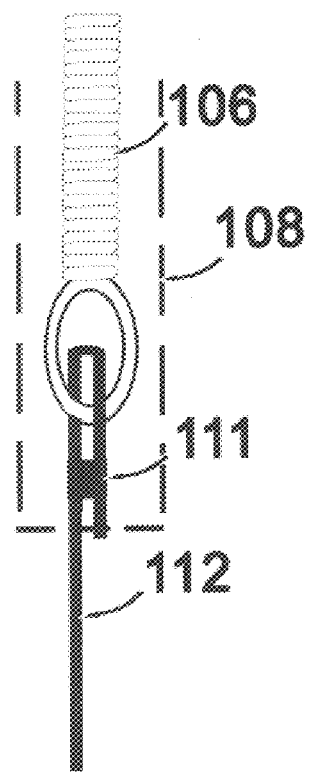
FIG. 5 is a large-scale detail of the spring/cable engagement.

The distal end of spring (106) is attached to cable (112) by the following method: The proximal end of cable (112) is formed into a loop and secured by using a crimped ferrule (111). Said loop of cable (112) is then captured by the bottom end loop of spring (106) and said end loop is pinched closed. This attachment is shown in detail in FIG. 5.

Spring (106) and chain/spring connection (104) and spring/cable connection (110) are enclosed in an expandable safety shroud (108).

Figure 6:
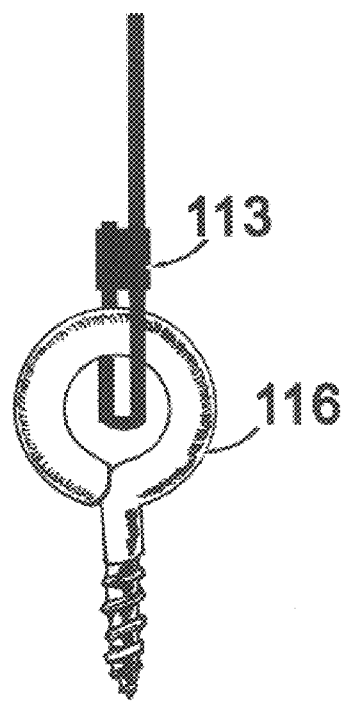
FIG. 6 is a large-scale detail of the cable/eye-lag-screw engagement.

At the distal end of cable (112), eye-lag-screw (116) is captured by passing the end of cable (112) through the eye of eye-lag-screw (116) and then crimping both parts of cable (112) in a ferrule (113). This cable/eye-lag-screw connection (114) is shown in detail in FIG. 6.

Eye-lag-screw (116) is inserted and screwed into typical food unit (C) by twisting said typical food unit (C).

Operation

In the preferred embodiment, with the present invention suspended from an overhead structure and a unit of food (such as an ear of corn) attached to the distal end of the invention, the feeder is ready for use. When a hungry animal, such as a squirrel, realizes that a short leap (12–24 inches) will bring it within reach of a favorite food, it will leap vertically and grasp the unit of food. The animal's weight will cause the spring to expand and contract, raising and lowering the animal in an entertaining manner.

Scope

Although the descriptions above contain many specificities, these should not be construed as limiting the scope of the invention but as merely providing illustrations of a preferred embodiment of this invention. For example, the suspension means may use other locking devices such as wire twists, spring snap, etc.; the spring may be engaged to the cable and chain in a different manner; the chain may be replaced with a different material offering alternative locking means; the food unit may be a container, such as a basket, offering alternative foods; the eye-lag-screw may be replaced with a spring snap or some other attachment device; etc.

Thus the scope of the invention should be determined by the appended claims and their legal equivalents, rather than by the examples given.

I claim:

1. An animal feeding apparatus having a first end and a second end, comprising:
   a mounting region located at the first end;
   a resilient biasing device coupled to the mounting region, the resilient biasing device having a biasing force within a range that is capable of suspending an animal above the ground and moving the animal in a substantially oscillating motion;
   a food attachment device coupled to the resilient biasing device, and located at the second end;
   a mounting device attached to the mounting region, the mounting device including a length of chain; and
   a length of metal cable coupled between the resilient biasing device and the food attachment device.

2. The animal feeding apparatus of claim 1, wherein the resilient biasing device includes a coil spring.

3. The animal feeding apparatus of claim 1, wherein the resilient biasing device includes a biasing force within a range that is capable of suspending a typical squirrel above the ground and moving the typical squirrel in a substantially oscillating motion.

4. The animal feeding apparatus of claim 1, wherein the food attachment device includes a screw.

5. An animal feeding apparatus having a first end and a second end, comprising:
   a metal mounting device;
   a metal spring coupled to the mounting device, the metal spring having a spring force within a range that is capable of suspending an animal above the ground and moving the animal in a substantially oscillating motion;
   a flexible shield substantially covering the metal spring;
   a length of metal cable coupled to the resilient biasing device; and
   a metal food attachment device coupled to the length of metal cable, and located at the second end.

6. An animal feeding apparatus having a first end and a second end, comprising:
   a mounting region located at the first end;
   a plurality of length adjusting members attached to the mounting region;
   a resilient biasing device coupled to the plurality of length adjusting members, the resilient biasing device having a biasing force within a range that is capable of suspending an animal above the ground and moving the animal in a substantially oscillating motion; and
   an article of food located at the second end and coupled to the resilient biasing device using a food attachment device.

7. The animal feeding apparatus of claim 6, wherein the plurality of length adjusting members includes a length of chain.

8. The animal feeding apparatus of claim 6, further including a length of flexible material coupled between the resilient biasing device and the food attachment device.

9. The animal feeding apparatus of claim 8, wherein the length of flexible material includes a length of metal cable.

10. The animal feeding apparatus of claim 6, wherein the resilient biasing device includes a coil spring.

11. The animal feeding apparatus of claim 6, wherein the article of food includes a cob of corn.

* * * * *